United States Patent
Barnwell

(10) Patent No.: US 9,700,835 B2
(45) Date of Patent: Jul. 11, 2017

(54) THERMOELECTRIC COMPRESSED AIR AND/OR INERT GAS DRYER

(75) Inventor: James W. Barnwell, Moravian Falls, NC (US)

(73) Assignee: SPX FLOW TECHNOLOGY USA, INC., Ocala, FL (US)

(*) Notice: Subject to any disclaimer, the term of this patent is extended or adjusted under 35 U.S.C. 154(b) by 123 days.

(21) Appl. No.: 12/985,794

(22) Filed: Jan. 6, 2011

(65) Prior Publication Data

US 2012/0174599 A1 Jul. 12, 2012

(51) Int. Cl.
 *F25B 21/02* (2006.01)
 *F24F 3/14* (2006.01)
 *B01D 53/26* (2006.01)

(52) U.S. Cl.
 CPC ........ *B01D 53/265* (2013.01); *B01D 2257/80* (2013.01); *F25B 21/02* (2013.01)

(58) Field of Classification Search
 CPC .... B01D 53/265; B01D 2257/80; F25B 21/02
 USPC .................. 62/3.3, 3.6, 94, 271, 259.4, 304
 See application file for complete search history.

(56) References Cited

U.S. PATENT DOCUMENTS

| | | | |
|---|---|---|---|
| 2,944,404 A * | 7/1960 | Fritts ................................ | 62/3.4 |
| 4,065,936 A * | 1/1978 | Fenton et al. .................... | 62/3.3 |
| 4,231,256 A | 11/1980 | Chapman et al. | |
| 5,431,021 A * | 7/1995 | Gwilliam et al. ................ | 62/3.7 |
| 5,655,375 A * | 8/1997 | Ju .................................... | 62/3.6 |
| 6,250,083 B1 * | 6/2001 | Chou ................................ | 62/3.4 |
| 6,293,107 B1 | 9/2001 | Kitagawa et al. | |
| 6,378,311 B1 * | 4/2002 | McCordic ........................ | 62/3.4 |
| 6,463,743 B1 * | 10/2002 | Laliberte ......................... | 62/3.3 |
| 6,772,534 B2 * | 8/2004 | Gomes et al. .................. | 34/330 |
| 7,448,222 B2 * | 11/2008 | Bormann ......................... | 62/3.7 |
| 2006/0288709 A1 * | 12/2006 | Reidy .............................. | 62/3.4 |

(Continued)

FOREIGN PATENT DOCUMENTS

| | | |
|---|---|---|
| CN | 1094500 A | 11/1994 |
| CN | 1389698 A | 1/2003 |
| EP | 1210967 A1 | 6/2002 |

(Continued)

OTHER PUBLICATIONS

International Search Report of PCT/US2011/061185 filed Nov. 17, 2011 in the name of SPX Corporation.

(Continued)

*Primary Examiner* — Larry Furdge
(74) *Attorney, Agent, or Firm* — Baker and Hostetler LLP

(57) ABSTRACT

A gas dryer includes a first opening structure forming a cooling pathway fluidly connected to the first opening; a first thermoelectric device thermally connected to the structure forming the cooling pathway and a heat exchanger. A condensate drain is located near an end of the cooling pathway and configured to drain condensate formed when a fluid is cooled along the cooling pathway. A structure forming a warming pathway is located between the condensate drain and a second opening, and a second thermoelectric device thermally connected between the structure forming cooling pathway and the structure forming the warming pathway and connected to exchange heat between the cooling pathway and the warming pathway. A method of drying a gas is provided.

20 Claims, 4 Drawing Sheets

(56) References Cited

U.S. PATENT DOCUMENTS

2009/0049843 A1 2/2009 Albayrak et al.

FOREIGN PATENT DOCUMENTS

| | | |
|---|---|---|
| FR | 2779972 A1 | 12/1999 |
| GB | 2257372 A | 1/1993 |
| NL | 404141 A | 12/1965 |
| WO | 94/12833 A1 | 6/1994 |

OTHER PUBLICATIONS

International Search Report for corresponding International Application No. PCT/US2011061185 dated May 22, 2014.
Supplementary European Search Report for corresponding International Application No. PCT/US2011061185 dated Jun. 11, 2014.

* cited by examiner

THERMOELECTRIC COMPRESSED AIR AND/OR INERT GAS DRYER

FIELD OF THE INVENTION

The present invention relates generally to an air or gas dryer. More particularly, the present invention relates to a method and apparatus for drying air used in pneumatic tools.

BACKGROUND OF THE INVENTION

Pneumatic tools use compressed air to provide power to the tool. Pneumatic tools are often made of metal components that are susceptible to rust or other corrosion when in contact with moisture. As a result, it is desired that the air used in the pneumatic tools have the moisture in the air removed as much as is practical. Often air used in pneumatic systems may be dried using desiccants. However, when a dew point is over 32° F. mechanical refrigeration is often used. Mechanical refrigeration cools the air which then lowers the dew point. As the air cools, the moisture in the air will condense. The condensate can be separated from the air. The air is then heated back up to a desired temperature. Thus heated air is considered a dry or dried air due to the fact that moisture originally found in that air has been removed. Standard mechanical refrigeration apparatuses involve high energy using components, such as, a compressor to compress a refrigerant which is later expanded as part of the refrigeration cycle. In addition, the use of refrigerants may be undesirable due to potential environmental harm that may occur should the refrigerant leak. Further, mechanical refrigeration systems include many moving parts which wear and need to be maintained and/or replaced over time. As a result, it may be desired to dry air by cooling it and re-heating it without the use of a typical mechanical refrigeration system.

Accordingly, it is desirable to provide a method and apparatus that can cool and reheat air without the use of mechanical refrigeration systems.

SUMMARY OF THE INVENTION

The foregoing needs are met, to a great extent, by the embodiments of the present invention. Wherein in one aspect an apparatus is provided that in some embodiments provides cooling and in some embodiments heating of air and or to dry the air without the use of typical mechanical refrigeration systems.

In accordance with one embodiment of the present invention, a gas dryer is provided. The gas dryer includes a first opening; structure forming a cooling pathway fluidly connected to the first opening; a first thermoelectric device thermally connected to the structure forming the cooling pathway and a heat exchanger; a condensate drain located near an end of the cooling pathway and configured to drain condensate formed when a fluid is cooled along the cooling pathway; a structure forming a warming pathway located between the condensate drain and a second opening; and a second thermoelectric device thermally connected between the structure forming cooling pathway and the structure forming the warming pathway and connected to exchange heat between the cooling pathway and the warming pathway.

In accordance with another embodiment of the present invention, a method of drying a gas is provided. The method includes: directing the gas through a cooling pathway; removing heat from the gas in the cooling pathway with a first thermoelectric device to a heat exchanger; condensing a fluid out of the gas; draining the condensed fluid from the gas; directing the gas though a warming pathway; removing heat from gas in the cooling pathway with a second thermoelectric device and inserting that heat into gas in the warming pathway.

In accordance with yet another embodiment of the present invention, a gas dryer is provided. The gas dryer includes a first opening; structure forming a cooling pathway fluidly connected to the first opening; a first means for moving heat device thermally connected to the structure forming the cooling pathway and a heat exchanging means; a means for draining a liquid located near an end of the cooling pathway and configured to drain condensate formed when a fluid is cooled along the cooling pathway; a structure forming a warming pathway located between the means for draining a fluid and a second opening; and a second means for moving heat thermally connected between the structure forming cooling pathway and the structure forming the warming pathway and connected to exchange heat between the cooling pathway and the warming pathway.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
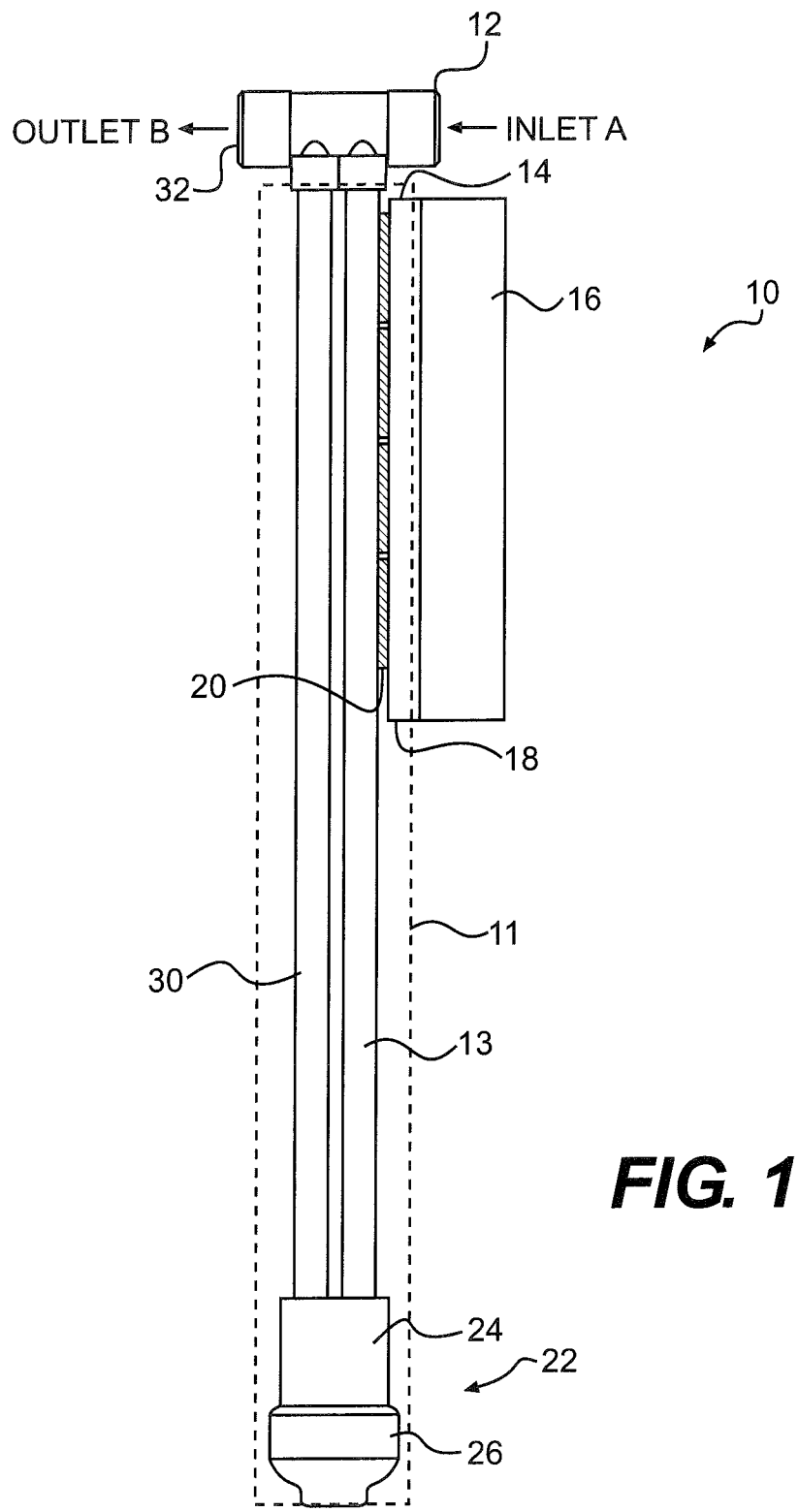
FIG. 1 is a side view of an air or gas dryer according to an embodiment of the invention.

Example embodiments of the invention will now be described with reference to the drawing figures, in which like reference numerals refer to like parts throughout. An embodiment in accordance with the present invention provides a gas dryer.

FIG. 1 illustrates an example embodiment of a gas dryer 10. A gas dryer 10 may include a housing 11. The housing 11 may be metal, plastic, or any other suitable substance. The housing 11 provides protection for the interior components of the gas dryer 10.

According to some embodiments of the invention, the gas dryer 10 includes an air inlet 12. The gas dryer 10 includes a chiller extrusion 13. The chiller extrusion 13 maybe made of metal, such as aluminum. In some embodiments the chiller extrusion 13 is made of extruded aluminum. The gas dryer 10 also includes a heat exchanger 14. The heat exchanger 14 may be a fin heat exchanger which includes fins 16. Opposite the fins 16 on to the heat exchanger 14 is a hot side 18 which is abutted against a thermal electric device (TE device) 20.

The chiller extrusion 13 terminates with a separator 22. A separator 22 includes a separator bowl 24 and a separator end cap 26. Located on the opposite side of the chiller extrusion 13 is a heating extrusion 30.

In some embodiments of the invention, the heating extrusion 30 may also be made of extruded aluminum. In other embodiments of the invention, the heating extrusion 30 may be interchangeable and identical to the chiller extrusion 13, the only difference being placement within the gas dryer 10. In other embodiments of the invention the heating extrusion 30 may be different than the chiller extrusion 13. The heating extrusion 13 connects to an outlet 32. While the chiller and heating extrusion 13 and 30 are referred to herein as extrusions it is understood that the extrusions 13 and 30 are not limited to actually extruded parts, but may include parts that provide cooling and heating pathways made by any suitable technique.

In some embodiments of the invention compressed air or other gas is provided to the inlet 12 as shown by arrow A. The compressed air flows through one or more pathways defined by the chiller extrusion 13. The gas or compressed air flows through the chiller extrusion 13. The TE device 20 is provided electric current which causes the TE device on the side facing the chiller extrusion 13 to be cold and the side of the TE device 20 facing the heat exchanger 14 to be hot. Heat is transferred from the gas in the chiller extrusion 13, into the cool side of the TE device 20, and then eventually to the heat exchanger 14 and to the fins 16 of heat exchanger. The heat is then dissipated into the ambient air surrounding the gas dryer 10.

As the air or gas flows through the chiller extrusion 13 and cools, moisture condenses and the condensate flows into the separator 22. After the air is dried by the moisture condensing and draining into the separator 22 the air or gas flows into the heating extrusion 30. In the heating extrusion, the air or gas is re-heated and then finally is let out of the outlet 32 is indicated by arrow B.

Figure 2:
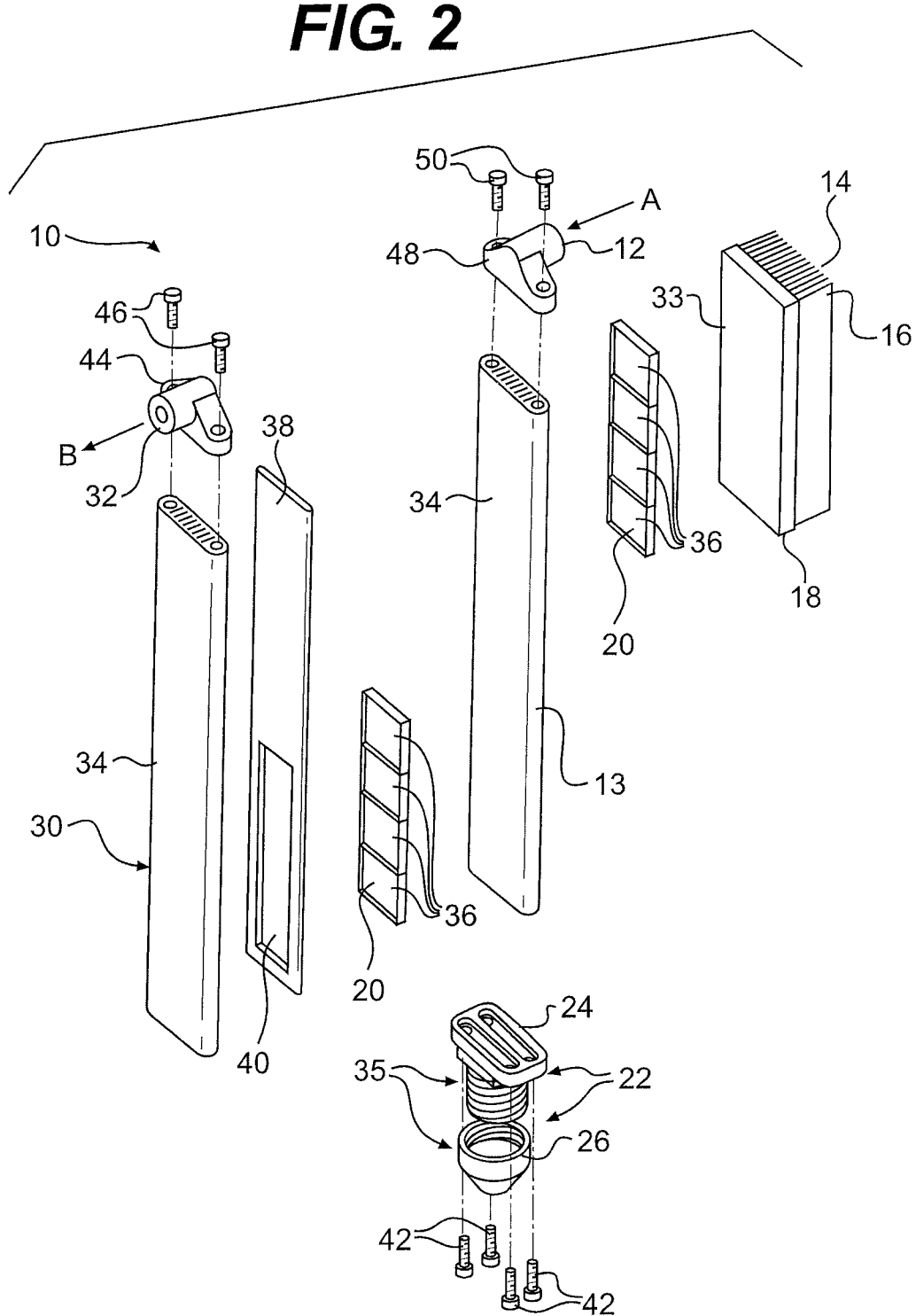
FIG. 2 is an exploded perspective view of the gas dryer shown in FIG. 1.

FIG. 2 shows and exploded view of the gas dryer 10. As shown in FIG. 2 the heat exchanger 14 has a hot side 18 and on the opposite side are fins 16. The heat exchanger 14 allows heat from the hot side to flow into the fins 16 where the fins 16 contact the ambient air of the gas dryer 10 and dissipate the heat. The hot side 18 includes a flat side 33 which abuts against the TE device 20. As shown in FIG. 2, the TE device 20 includes several TE chips 36. While four TE chips 36 are shown, the TE device 20 may include any number of TE chips 36, from one to any desired number. The TE chips 36 may be Peltier devices. One of ordinary skill in the art understands that a Peltier device to operate in such a manner such that when provided a voltage, one side gets hot and the other side of the Peltier device gets cold. The TE device 20 is situated so the cold side of the TE chips 36 abuts against the chiller extrusion 13, when the hot side abuts against the flat surface 33 of the heat exchanger 14.

The separator 22 is comprised of a separator bowl 24 and a separator end cap 26. A separator bowl 24 and a separator end cap 26 may be screwed together by threads 35. The separator 22 may attach to both the chiller extrusion 13 and the heating extrusion 30 by separator screws 42.

Insulation 38, may be located in between the chiller extrusion 13 and the heating extrusion 30. Hole 40 in the insulation 38 is provided and a second TE device 20 is located within the hole 40. The second TE Device 20 may also include multiple TE chips 36. TE chips 36 are oriented so that the cold side of the chip 36 is located against the flat side 34 of the chiller extrusion 13 and the hot side of the TE chips 36 is located against the heating extrusion 30.

The outlet 32 is located in an outlet manifold 44, which may be attached to the heating extrusion 30 by cap screws 46. The inlet 12 is part of an inlet manifold 48 which may attach to the chiller extrusion 13 by cap screws 50. Arrows A and B illustrate the direction of air or gas entering A and exiting B in gas dryer 10.

Figure 3:
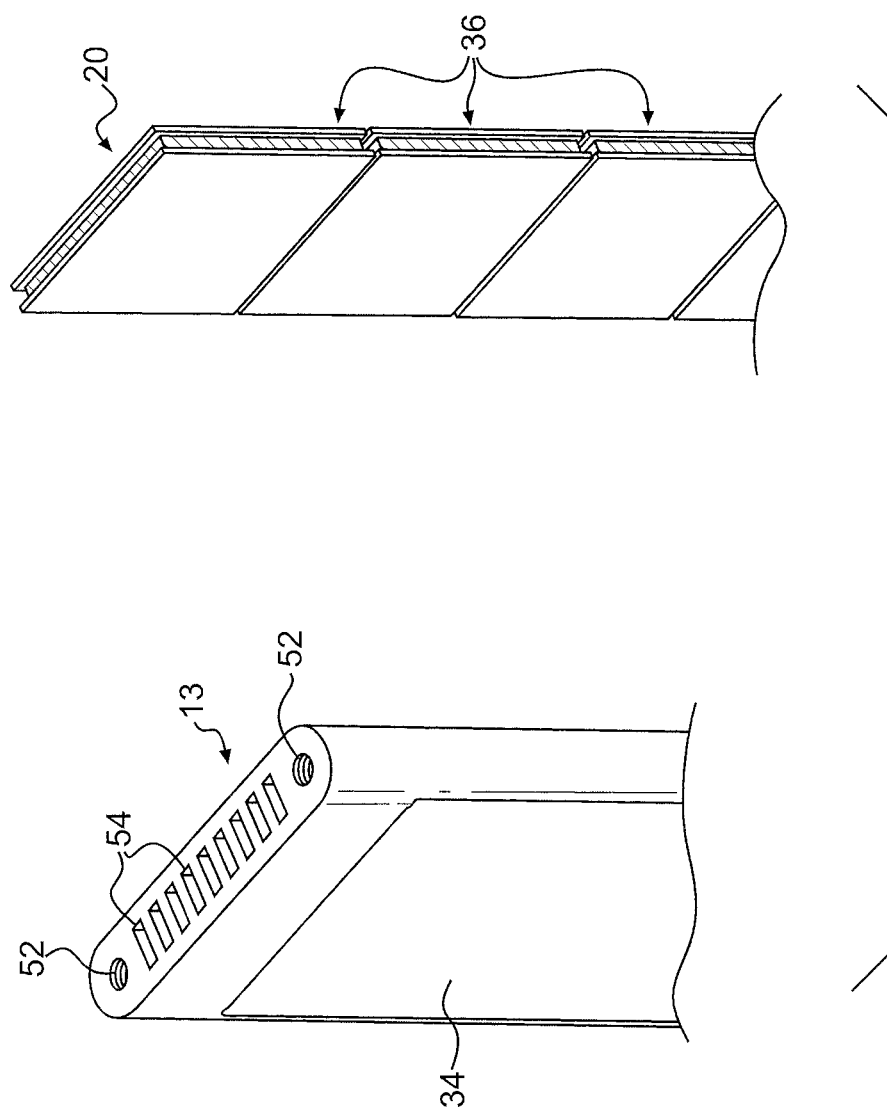
FIG. 3 is an enlarged perspective view of some of the components of the air dryer shown in FIGS. 1 and 2.

FIG. 3 is a partial close-up view of the chiller extrusion 13 and the TE device 20 including the TE chips 36. The chiller extrusion 13 includes threaded holes 52 which allow the cap screws 50 as shown in FIG. 2 to attach the inlet manifold 48 to the chiller extrusion 30. The chiller extrusion 30 also includes multiple passage ways 54. The passage ways are shown as various slots which allow the air or gas to flow through the chiller extrusion 13. In some embodiments of the invention, the passage ways 54 may be more or fewer than as shown and may have a variety of different shapes. In the embodiment shown in FIG. 3 and the passage ways 54 are rectangular in cross-section and extend through the length of the chiller extrusion 13. In other embodiments the passage ways 54 may have other cross-sectional shapes. Preferably the shapes of the passageways 54 are selected to promote heat transfer.

As mentioned above, the heating extrusion 30 may be interchangeable and thus identical in size and dimension and composition as the chiller extrusion 13. Therefore, the description given with respect to the chiller extrusion 13 may also apply to the heating extrusion 30. One of ordinary skill in the art would understand that the threaded holes 52 would allow the outlet manifold 44 to attach to the heater extrusion 30 in a matter similar to that discussed above with respect to the inlet manifold 48 attaching it to the chiller extrusion 13 with the cap screws 50.

The chiller extrusion 13 also includes a flat surface 34 as discussed above. Also shown in FIG. 3 is the TE device 20 comprising multiple TE chips 36. When the TE device 20 is located against the chiller extrusion 13 or, as indicated in FIG. 2, against the heating extrusion 30, a heat transfer paste may be applied to either or both of the extrusions 13 and 30 and the TE device 20 to facilitate heat transfer between the extrusions 13 and 30 and the TE device 20. A heat transfer paste may also be placed between the TE device 20 and the flat side 33 of the heat exchanger 14, shown in FIG. 2.

Figure 4:
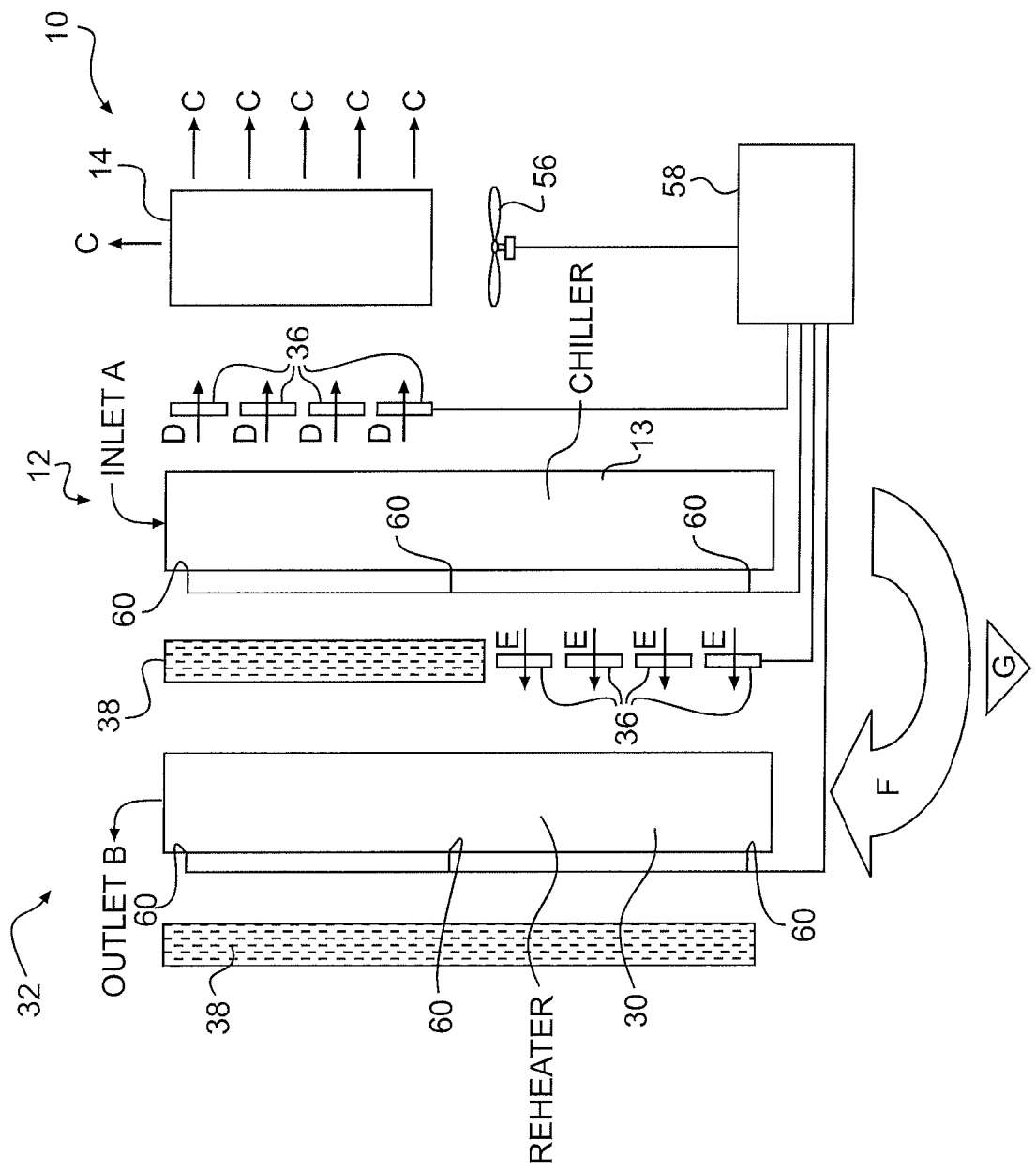
FIG. 4 is a schematic diagram showing various components of the gas dryer and how the gas flows through the gas dryer.

FIG. 4 is a schematic diagram of a gas dryer 10 having a fan 56 a controller 58, and sensors 60. As the gas enters the inlet 12 in the direction of arrow A, the gas moves through the passageways 54 (see FIG. 3) in the chiller extrusion 13, heat from the gas moves in the direction of Arrows D through the TE chips 36 into the heat exchanger 14. Heat may also leave the gas in the chiller extrusion 13 by the second set of the TE chips 36 and move to the gas in the heating extrusion 30 as shown by arrows E. Heat leaves the heat exchanger 14 in the direction of arrows C.

In some embodiments of the invention, air flows over the heat exchanger 14, this air flow is provided by the fan 56. The fan 56 is an optional feature and not all embodiments may include a fan 56.

The fan 56 may be controlled by a controller 58. A controller 58 may be operably connected to various sensors 60. Depending upon the data provided by the sensors 60, the fan 56 and the TE devices 36 may be controlled by the controller 58. The controller 58 may control the TE chips 36, providing less or additional current to TE chips 36. Controlling the TE chips 36 in this manner will cause more or less heat may be moved from the chiller extrusion 13 to either the heat exchanger 14 or into the re-heater 30.

Various TE chips 36 may be controlled as a block in a first set located between the chiller extrusion 13 and heat exchanger 14 and a second set located between the chiller extrusion 13 and the re-heater 30. In alternate embodiments of the invention, each of the TE chips 36 may be individually controlled by the controller 58. As the gas moves through the chiller extrusion 13 it cools and moisture condenses and drops in the direction of arrow G into the separator 22 as shown in FIG. 1 and FIG. 2.

In some embodiments of the invention, the separator 22 may be connected to a hose or a drain or to drain the condensate away from the gas dryer 10. Arrow G schematically represents the removal of the condensate from the gas in the gas dryer 10.

The flow of gas from the chiller extrusion 13 is turned and moved in the direction of arrow F. Gas flows into the re-heater 30 (aka the heating extension 30). Arrows E show heat being removed from the gas and the chiller extrusion 13 and placed into gas located in the re-heater 30. Removing the heat generated by the second set of TE chips 36 by using the coldest air or gas temperature rather than ambient air, the performance of these chips is enhanced and a lower air or gas temperature is possible with less energy expended. Insulation 38 is located between both the re-heater 30 and chiller 13 as shown and also maybe located between the re-heater 30 and the housing 11 (housing 11 is not shown in FIG. 4 but is shown in FIG. 1). The gas is then exited out of the outlet 32 in the direction of arrow B.

In some embodiments of the invention, the gas entering the inlet 12, may be about 100° F. Gas may be cooled down to about 35-40° F. as it reaches the bottom of the chiller 13 just before it enters into the separator 22. The air or gas may be reheated back up to about 100° F. in the re-heater 30 before it exits the outlet 32. However, these mentioned temperatures are meant to be examples only, other temperatures may also be used in accordance with the invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A compressed gas dryer comprising:
   a first opening for receiving compressed gas into the gas dryer;
   a chiller extrusion having at least two opposing flat surfaces, the chiller extrusion comprising a precooling pathway fluidly connected to the first opening and a cooling pathway fluidly connected to and located downstream of the precooling pathway;
   a first thermoelectric device thermally connected to the precooling pathway of the chiller extrusion and a heat exchanger, the first thermoelectric device comprising a cold side and a hot side, the cold side abutting the flat surface of the chiller extrusion and configured to precool the compressed gas passing through the precooling pathway, the hot side facing the heat exchanger opposite the precooling pathway of the chiller extrusion, wherein the heat exchanger is configured to transfer heat from the compressed gas in the precooling pathway and the hot side of the first thermoelectric device to outside of the gas dryer using ambient air;
   a condensate drain located near an end of the cooling pathway of the chiller extrusion configured to drain condensate formed when the compressed gas is cooled along the precooling pathway and the cooling pathway of the chiller extrusion;
   a heating extrusion having at least two opposing flat surfaces, the heating extrusion located between the condensate drain and a second opening, wherein the heating extrusion is configured to cool a second thermoelectric device while heating the cooled compressed gas exiting from the cooling pathway of the chiller extrusion and deliver heated dry gas to the second opening; and
   a second thermoelectric device located downstream from the first thermoelectric device and thermally connected between the chiller extrusion and the heating extrusion, the second thermoelectric device comprising a hot side and a cold side, the hot side abutting the flat side of the heating extrusion and configured to heat the compressed gas passing through the heating extrusion, the cold side abutting the flat side of the chiller extrusion opposite of the first thermoelectric device and configured to further cool the compressed gas passing through the cooling pathway and transfer heat from the compressed gas passing through the cooling pathway to the heating extrusion;
   wherein the second thermoelectric device is connected to exchange heat between the chiller extrusion and the heating extrusion, and the first and second thermoelectric devices are separate components and are not part of the heat exchanger, and the first thermoelectric device and heat exchanger form a precooling section upstream of the second thermoelectric device and are configured to precool the compressed gas in the chiller extrusion before the compressed gas contacts the second thermoelectric device.

2. The compressed gas dryer of claim 1, wherein the heat exchanger is a fin heat exchanger comprising fins located opposite of the hot side of the first thermoelectric device, and the fins are configured to dissipate the heat from the hot side of the first thermoelectric device using ambient air from the gas dryer.

3. The compressed gas dryer of claim 1, wherein at least one of the chiller extrusion and the heating extrusion is defined by an opening in an extruded aluminum piece.

4. The compressed gas dryer of claim 1, wherein the chiller extrusion and the heating extrusion are interchangeable.

5. The compressed gas dryer of claim 1, further comprising a controller operatively connected to the first and second thermoelectric devices and configured to control the devices.

6. The compressed gas dryer of claim 5, further comprising sensors placed in the chiller extrusion and the heating extrusion and operatively connected to the controller to send signals to the controller associated with a temperature sensed by the sensors.

7. The compressed gas dryer of claim 1, further comprising multiple thermoelectric devices located proximate to and configured to perform a similar function as the first thermoelectric device.

8. The compressed gas dryer of claim 1, further comprising multiple thermoelectric devices located proximate to and configured to perform a similar function as the second thermoelectric device.

9. The compressed gas dryer of claim 1, further comprising a heat transfer paste located between the first thermoelectric device and the chiller extrusion and the first thermoelectric device and the heat exchanger.

10. The compressed gas dryer of claim 1, further comprising a thermoelectric paste located between the second thermoelectric device and the structure forming the chiller extrusion and thermoelectric paste located between second thermoelectric device and the structure forming the heating extrusion.

11. The compressed gas dryer of claim 1, wherein at least one of the heating extrusion and the cooling extrusion is defined by a plurality of openings.

12. The compressed gas dryer of claim 1, wherein at least one of the chiller extrusion and the heating extrusion include tapped holes for connecting the condensate drain.

13. The compressed gas dryer of claim 1, wherein at least one of the chiller extrusion and the heating extrusion include tapped holes for connecting at least one of an inlet and an outlet manifold.

14. A method of drying a compressed gas comprising:
(a) receiving a supply of compressed gas into a gas dryer, the gas dryer comprising a chiller extrusion having at least two opposing flat surfaces, a precooling pathway fluidly connected to the supply of compressed gas and a cooling pathway fluidly connected to and located downstream of the precooling pathway;
(b) passing the supply of compressed gas through a precooling pathway;
(c) precooling the compressed gas in the precooling pathway using a first thermoelectric device comprising a cold side and a hot side, wherein the cold side abuts the flat surface of the chiller extrusion and is in thermal contact with the compressed gas in the precooling pathway;
(d) transferring heat from the compressed gas in the precooling pathway and heat from the hot side of the first thermoelectric device to outside of the gas dryer using ambient air and a heat exchanger, wherein the heat exchanger is thermally connected to the hot side of the first thermoelectric device;
(e) passing the precooled compressed gas from the precooling pathway to the cooling pathway;
(f) cooling the compressed gas in the cooling pathway using a second thermoelectric device located downstream from the first thermoelectric device, the second thermoelectric device comprising a hot side and a cold side, wherein the cold side abuts the flat surface of the chiller extrusion opposite of the first thermoelectric device and is in thermal contact with the compressed gas in the cooling pathway;
(g) condensing a liquid out of the compressed gas cooled by the precooling pathway and the cooling pathway;
(h) draining the condensed liquid from the compressed gas to a condensate drain located near the end of the cooling pathway;
(i) directing the cooled compressed gas from the cooling pathway through a heating extrusion, wherein the heating extrusion has at least two opposing flat surfaces and is located between the condensate drain and a second opening in the gas dryer for delivering dry compressed gas;
(j) heating the compressed gas in the heating extrusion using the hot side of the second thermoelectric device; wherein the hot side abuts the flat side of the heating extrusion and is in thermal contact with the compressed gas in the heating extrusion; and
(k) directing the heated compressed gas from the heating extrusion to the second opening.

15. The method of claim 14, further comprising sensing the temperature of the gas at various locations in the chiller and heating extrusions and controlling the first and second thermoelectric devices in view of the sensed temperatures.

16. The compressed gas dryer of claim 1, further comprising a first insulation piece between the chiller extrusion and the heating extrusion, abutting the flat surfaces of the chiller extrusion and the heating extrusion, wherein the first insulation piece extends the length of the first thermoelectric device; and a second insulation piece abutting the flat surface of the heating extrusion opposite the chiller extrusion, wherein the second insulation piece extends the length of the heating extrusion.

17. The compressed gas dryer of claim 1, wherein the gas exiting the dryer at the second opening is about the same temperature as the gas entering the dryer at the first opening.

18. The compressed gas dryer of claim 1, wherein the precooling pathway and the cooling pathway in the chiller extrusion are designed to minimize the temperature difference between the hot side and the cold side in the first and the second thermoelectric devices and increase the efficiency of the first and the second thermoelectric devices.

19. A compressed gas dryer comprising:
a first opening for receiving compressed gas into the gas dryer;
a chiller extrusion having at least two opposing flat surfaces, the chiller extrusion comprising a precooling pathway fluidly connected to the first opening and a cooling pathway fluidly connected to and located downstream of the precooling pathway;
a first thermoelectric device thermally connected to the precooling pathway of the chiller extrusion and a heat exchanger, the first thermoelectric device comprising a cold side and a hot side, the cold side abutting the flat surface of the chiller extrusion and configured to precool the compressed gas passing through the precooling pathway, the hot side facing the heat exchanger opposite the precooling pathway of the chiller extrusion, wherein the heat exchanger comprises fins located opposite of the hot side of the first thermoelectric device, and the heat exchanger is configured to transfer heat from the compressed gas in the precooling pathway and the hot side of the first thermoelectric device to outside of the gas dryer using ambient air;
a condensate drain located near an end of the cooling pathway of the chiller extrusion configured to drain condensate formed when the compressed gas is cooled along the precooling pathway and the cooling pathway of the chiller extrusion;
a heating extrusion having at least two opposing flat surfaces, the heating extrusion located between the condensate drain and a second opening, wherein the heating extrusion is configured to heat the cooled compressed gas exiting from the cooling pathway of the chiller extrusion and deliver heated dry gas to the second opening; and a second thermoelectric device located downstream from the first thermoelectric device and thermally connected between the chiller extrusion and the heating extrusion, the second thermoelectric device comprising a hot side and a cold side, the hot side abutting the flat side of the heating extrusion and configured to heat the compressed gas passing through the heating extrusion, the cold side abutting the flat side of the chiller extrusion opposite of the first thermoelectric device and configured to cool the compressed gas passing through the cooling pathway and transfer heat from the compressed gas passing through the cooling pathway to the heating extrusion;

a first insulation piece between the chiller extrusion and the heating extrusion, abutting the flat surfaces of the chiller extrusion and the heating extrusion, wherein the first insulation piece extends the length of the first thermoelectric device;

and a second insulation piece abutting the flat surface of the heating extrusion opposite the chiller extrusion, wherein the second insulation piece extends the length of the heating extrusion;

wherein the second thermoelectric device is connected to exchange heat between the chiller extrusion and the heating extrusion, and the first and second thermoelectric devices are separate components and are not part of the heat exchanger, and the first thermoelectric device and heat exchanger form a precooling section upstream of the second thermoelectric device and are configured to precool the compressed gas in the chiller extrusion before the compressed gas contacts the second thermoelectric device.

20. The method of claim 14, wherein the heating step further comprises heating the gas in the heating extrusion to about the same temperature as the initial temperature of the compressed gas received into the dryer through the first opening.

* * * * *